(12) United States Patent
Kraska et al.

(10) Patent No.: US 6,274,265 B1
(45) Date of Patent: Aug. 14, 2001

(54) METHOD AND SYSTEM FOR EVALUATING AN ELECTROCHEMICAL CELL FOR USE WITH AN IMPLANTABLE MEDICAL DEVICE

(75) Inventors: Robert E. Kraska, Minneapolis; Donald R. Merritt, Brooklyn Center; Craig L. Schmidt, Eagan; Paul M. Skarstad, Plymouth, all of MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 09/358,031

(22) Filed: Jul. 21, 1999

(51) Int. Cl.[7] .................................................. H01M 10/48
(52) U.S. Cl. .............................. 429/90; 429/48; 429/91; 429/426; 429/429; 429/431; 429/433
(58) Field of Search ................... 429/48, 90, 91; 324/426, 429, 431, 433

(56) References Cited

U.S. PATENT DOCUMENTS

| | | | |
|---|---|---|---|
| 3,714,004 | * 1/1973 | Riggs, Jr. et al. | 204/147 |
| 4,020,240 | * 4/1977 | Schlaikjer | 429/50 |
| 4,296,185 | * 10/1981 | Catanzarite | 429/48 |
| 5,328,782 | * 7/1994 | Binder et al. | 429/101 |
| 6,013,394 | * 1/2000 | Gan et al. | 429/325 |
| 6,117,591 | * 9/2000 | Takeuchi et al. | 429/231.95 |

OTHER PUBLICATIONS

W.D.K. Clark, K.C. Syracuse and M. Visbisky, J. Power Sources 65 (1997) 101–107.*

* cited by examiner

Primary Examiner—Carol Chaney
Assistant Examiner—Dah-Wei D. Yuan
(74) Attorney, Agent, or Firm—Girma Wolde-Michael; Thomas F. Woods

(57) ABSTRACT

A method of evaluating an electrochemical cell for a metallic contaminant-caused defect. The electrochemical cell is configured for use with an implantable medical device and includes an anode, a solid cathode and a liquid electrolyte. The method includes storing the cell at an elevated temperature following assembly for accelerating corrosion of possible metallic contaminants. A parameter of the cell related to cell voltage is then measured. An evaluation is made as to whether the cell is defective based upon this measured parameter.

55 Claims, 5 Drawing Sheets

■ = No burn-in, stored at 60° C
◆ = No burn-in, stored at 37° C
● = Burn-in, stored at 60° C
▲ = Burn-in, stored at 37° C

METHOD AND SYSTEM FOR EVALUATING AN ELECTROCHEMICAL CELL FOR USE WITH AN IMPLANTABLE MEDICAL DEVICE

FIELD OF THE INVENTION

The present invention relates to a method for evaluating an electrochemical cell configured for use with an implantable medical device. More particularly, it relates to an accelerated metallic contaminant testing method for an implantable medical device electrochemical cell.

BACKGROUND OF THE INVENTION

A variety of different implantable medical devices (IMD) are available for therapeutic stimulation of the heart and are well known in the art. For example, implantable cardiac defibrillators are used to treat patients suffering from ventricular fibrillation, a chaotic heart rhythm that can quickly result in death if not corrected. In operation, the defibrillator device continuously monitors the electrical activity of the heart of the patient, detects ventricular fibrillation, and in response to that detection, delivers appropriate shocks to restore a normal heart rhythm. Similarly, an automatic implantable defibrillator (AID) is available for therapeutic stimulation of the heart. In operation, an AID device detects ventricular fibrillation and delivers a non-synchronous high-voltage pulse to the heart through widely spaced electrodes located outside of the heart, thus mimicking transthoracic defibrillation. Yet another example of a prior art cardioverter includes the pacemaker/cardioverter/defibrillator (PCD) disclosed, for example, in U.S. Pat. No. 4,375,817 to Engle et al. This device detects the onset of tachyarrhythmia and includes means to monitor or detect progression of the tachyarrhythmia so that progressively greater energy levels may be applied to the heart to interrupt a ventricular tachycardia or fibrillation. Numerous other, similar implantable medical devices, for example a programmable pacemaker, are further available.

Regardless of the exact construction and use, each of the above-described implantable medical devices relies upon a power source or battery to provide requisite stimulation. Depending upon the particular application, the power source may be required to provided a stimulation energy of as little as 0.1 Joules for pacemakers to as much 40 Joules for implantable defibrillators. In addition to providing a sufficient stimulation energy, the power. source must possess low self-discharge to have a useful life of many months, must be highly reliable, and must be able to supply energy from a minimum packaged volume.

Suitable power sources or batteries for IMDs are virtually always electrochemical in nature, commonly referred to as an electrochemical cell. Acceptable electrochemical cells for implantable medical devices typically include a case surrounding an anode, a separator, a cathode and an electrolyte. The anode material is typically a lithium metal or, for re-chargeable cells, a lithium ion containing body. For most high-energy applications, the cathode is a solid material, such as silver vanadium oxide (SVO), and the electrolyte is a liquid, such as a lithium salt in combination with an organic solvent. Examples of acceptable lithium-based cells are disclosed in U.S. Pat. Nos. 5,458,997; 5,312,458; 5,298,349; 5,250,373; 5,221,453; 5,114,811; 5,114,811; 5,114,810; 4,964,877; 4,830,840; 4,391,729; 4,310,609; and 5,766,797. All of the foregoing patents are hereby incorporated by reference herein in their respective entireties. As is well known to those skilled in the art, a number of other lithium-based cells for IMDs are available, such as lithium/iodine, lithium/thionyl chloride, lithium/manganese dioxide, lithium/copper sulfide, lithium/carbon monofluoride, lithium/sliver chromate, etc.

Due to the importance of consistent, long-term performance, electrochemical cell manufacturers have expended great efforts in perfecting not only cell design, but also the manufacturing processes themselves. Nonetheless, as with any other manufactured product, electrochemical cell defects may arise from time-to-time. One failure mechanism associated with lithium/organic electrolyte batteries is an inter-electrode short caused by an oxidizable metal particle introduced at the cathode potential. With time, the metal particle corrodes and the metal ions are transported to the anode. The ions are then reduced at the anode and the metal plates out, often growing back through the separator to the cathode, causing an electrically conductive pathway (or "short"). As a result of this unexpected metallic corrosion-caused short, the cell may not perform properly.

In view of the importance of IMD cell reliability, manufacturers subject each and every cell produced to rigorous quality tests, both during manufacture as well as following final assembly. With respect to metallic contaminants, the generally accepted evaluation technique entails first performing a "bum-in" on the cell following assembly. Generally speaking, burn-in consists of pre-discharging the cell by a small percentage of its total capacity. In addition to the metallic contamination evaluation described below, burn-in serves to confirm overall cell integrity and to stabilize cell components. For example, a typical burn-in procedure involves discharge of the cell across a resistance on the order of 100 ohms or higher (i.e., a relatively high resistance for a period several hours). Following burn-in, the cell is then stored for many days. During the storage, the cell voltage is periodically measured. A change (e.g., decrease) in the measured voltage is indicative of metallic contamination or cell defect. Typically, an absolute, minimum voltage value is employed to identify defective cells. The actual storage time employed may vary from manufacturer to manufacturer. However, general industry standards require a storage time of 11–30 days. Obviously, this lengthy storage process greatly increases overall manufacture cycle time, thereby complicating the manufacturer's ability to meet expedited orders, project daily production values, identifying manufacturing quality issues, etc.

SUMMARY OF THE INVENTION

The present invention overcomes the disadvantages of prior art evaluation techniques by providing a method and system for more rapidly identifying a metallic contaminant defect in an electrochemical cell.

The present invention has certain objects. That is, the present invention provides solutions to certain problems existing in prior art electrochemical cell metallic contaminant testing techniques such as the lengthy time period required for cell evaluation following assembly. Additionally, it is another object of the present invention to provide an evaluation method and system that consistently identifies defective cells. It is yet another object of the present invention to provide an evaluation technique that does not deleteriously affect cell performance.

At least some embodiments of the present invention include one or more of the following advantages: (a) cell evaluation for metallic contaminant defects occurs on expedited basis, in one preferred embodiment on the order of 1–3 days; (b) by storing cells at an elevated temperature, corrosion of metallic particles, if any, occurs more rapidly; (c) by preferably storing cells at an elevated potential, corrosion of metallic particles, if any, occurs more rapidly; (d) although cell storage time is greatly decreased, defective cells are consistently identified; and (e) overall cell performance is not negatively impacted by the improved testing methodology.

The present invention has certain features, including storing the assembled electrochemical cell at an elevated temperature. Cell storage at an elevated temperature accelerates metallic corrosion. As a result, possible metallic contaminant-caused defects can be identified on an expedited basis. Further, in one preferred embodiment, metallic contaminant corrosion is further accelerated by storing the cell at an elevated cathode potential. That is to say, in one preferred embodiment, the cell is not subjected to a burn-in prior to storage at the elevated temperature. By testing cells for metallic contaminant-caused defects at an elevated potential, a statistical comparison of cells produced in lot form can be employed to identify defective cells with a high degree of confidence. With the method and system of the present invention, metallic contaminant-caused defects are consistently identified with no test-induced cell deterioration.

Other features, advantages, and objects of the invention will be come apparent by referring to the appended drawings, detailed description and claims.

DETAILED DESCRIPTION OF THE PREFERRED EMBODIMENTS

In the following detailed description of the preferred embodiments, reference is made to the accompanying drawings which form a part hereof, and which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
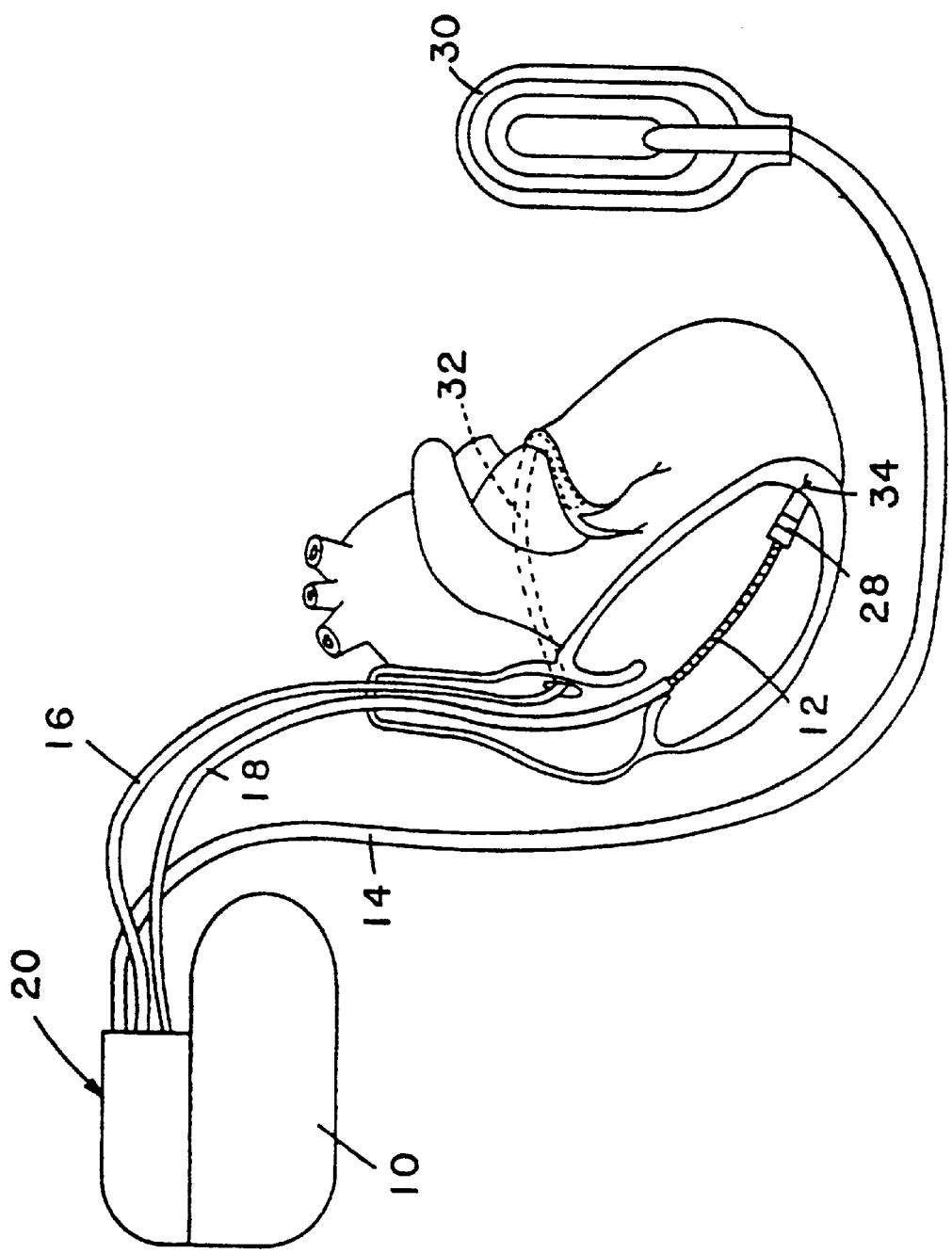
FIG. 1 is a simplified schematic view of one embodiment of an implantable medical device (IMD) incorporating an electrochemical cell tested in accordance with the present invention.

FIG. 1 is a simplified schematic view of one embodiment of an implantable medical device ("IMD") 10. The IMD 10 is shown in FIG. 1 as preferably being a pacemaker/cardioverter/defibrillator (PCD) and includes associated electrical leads 14, 16 and 18, and there relationship to a human heart 12. The leads 14, 16 and 18 are coupled to the IMD 10 by means of a multi-port connector block 20, which contains separate ports for each of the three leads illustrated 14, 16, and 18. The lead 14 is coupled to a subcutaneous electrode 30, which is intended to be mounted subcutaneously in the region of the left chest. Alternatively, an active "can" may be employed. The lead 16 is a coronary sinus lead employing an elongated coil electrode that is located in the coronary sinus and great vein region of the heart 12. The location of the electrode is illustrated in broken line format at 32, and extends around the heart 12 from a point within the opening of the coronary sinus to a point in the vicinity of the left atrial appendage.

The lead 18 is provided with elongated electrode coil 28 which is located in the right ventricle of the heart 12. The lead 18 also includes a helical stimulation electrode 34 which takes the form of an advanceable helical coil which is screwed into the myocardial tissue of the right ventricle. The lead 18 may also include one or more additional electrodes for near and far field electrogram sensing.

In the system illustrated, cardiac pacing pulses are delivered between the helical electrode 34 and the elongated electrode 28. The electrodes 28 and 34 are also employed to sense electrical signals indicative of ventricular contractions. As illustrated, it is anticipated that the right ventricular electrode 28 will serve as the common electrode during sequential and simultaneous pulse multiple electrode defibrillation regimens. For example, during a simultaneous pulse defibrillation regimen, pulses would simultaneously be delivered between the electrode 28 and the electrode 30, and between the electrode 28 and the electrode 32. During sequential pulse defibrillation, it is envisioned that pulses would be delivered sequentially between the subcutaneous electrode 30 and the electrode 28, and between the coronary sinus electrode 32 and the right ventricular electrode 28. Single pulse, two electrode defibrillation pulse regimens may also be provided, typically between the electrode 28 and the coronary sinus electrode 32. Alternatively, single pulses may be delivered between the electrodes 28 and 30. The particular interconnection of the electrodes to the IMD 10 will depend somewhat on which specific single electrode pair defibrillation pulse regimen is believed more likely to be employed.

A more detailed description of the leads illustrated can be found in U.S. Pat. No. 4,932,407 issued to Williams. Alternatively, the IMD 10 may assume a wide variety of other forms. For example, the IMD 10 may be an implantable cardiac defibrillator (ICD as is known in the art). Alternatively, or in addition, the IMD 10 may be an implantable cardiac pacemaker, for example such as that disclosed in U.S. Pat. No. 5,158,078 to Bennett et al.; U.S. Pat. No. 5,312,453 to Shelton et al.; or U.S. Pat. No. 5,144,949 to Olson, all hereby incorporated by reference herein, each in its respective entirety. Even further, the IMD 10 may be an implantable neurostimulator described, for example, in U.S. Pat. No. 5,342,409 to Mullet; or an implantable drug pump; cardiomyostimulator; etc.

Figure 2:
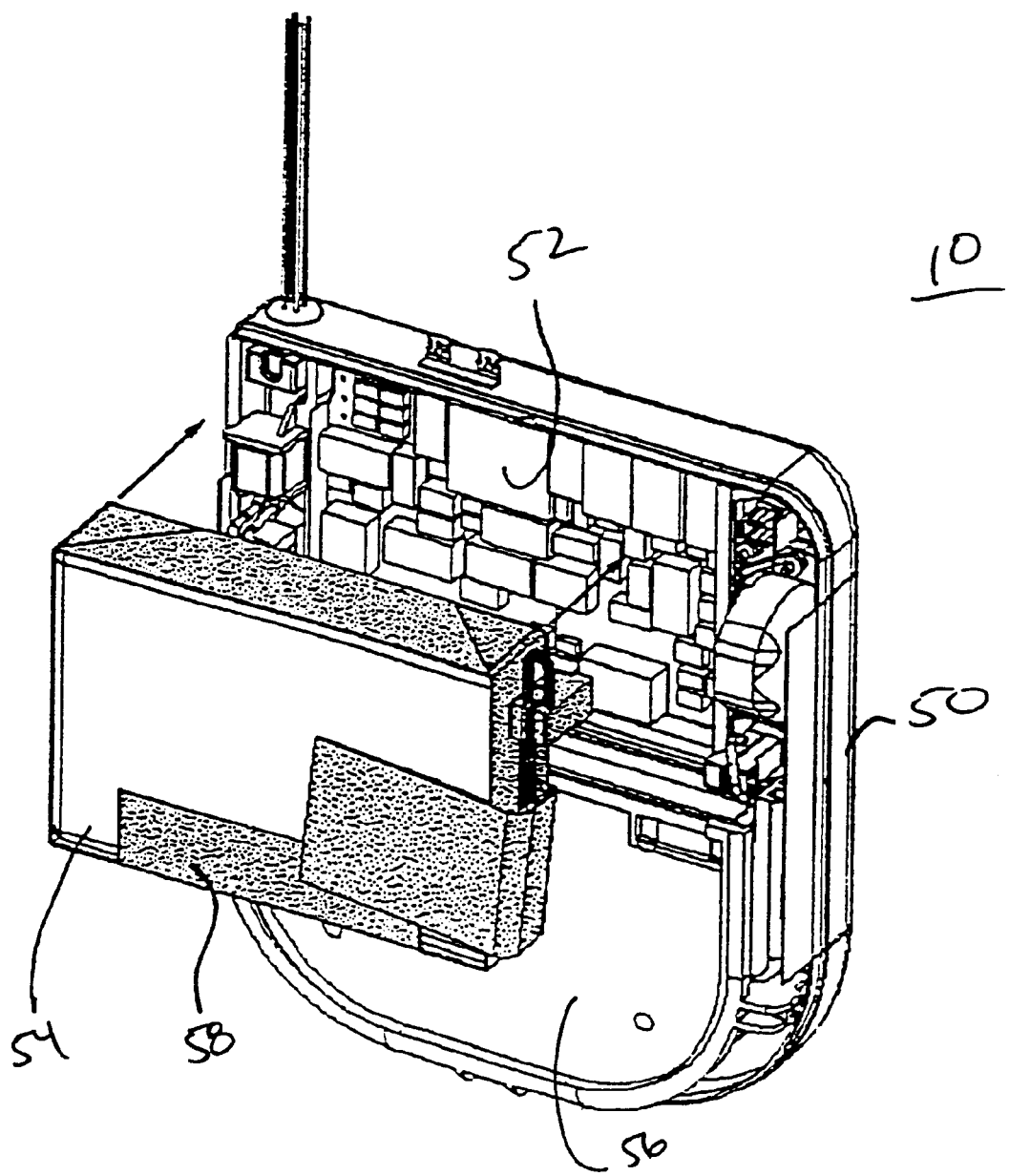
FIG. 2 is an exploded perspective view of various components, including an electromechanical cell, disposed within the housing of one embodiment of an IMD.

As previously described, the IMD 10 may assume a wide variety of forms as known in the art. One example of various components of the IMD 10 for PCD applications is shown in FIG. 2. The IMD 10 includes a case 50 (the right-hand side of which is shown in FIG. 2), an electronics module 52, a battery or cell 54 and capacitor(s) 56. Each of the components of the IMD 10 is preferably configured for the particular end-use application. Thus, the electronics module 52 is configured to perform one or more sensing and/or stimulation processes. The cell 54 includes an insulator 58 disposed therearound. The cell 54 provides the electrical energy to charge and re-charge the capacitor(s) 56, and also powers the electronics module 52.

Figure 3A:
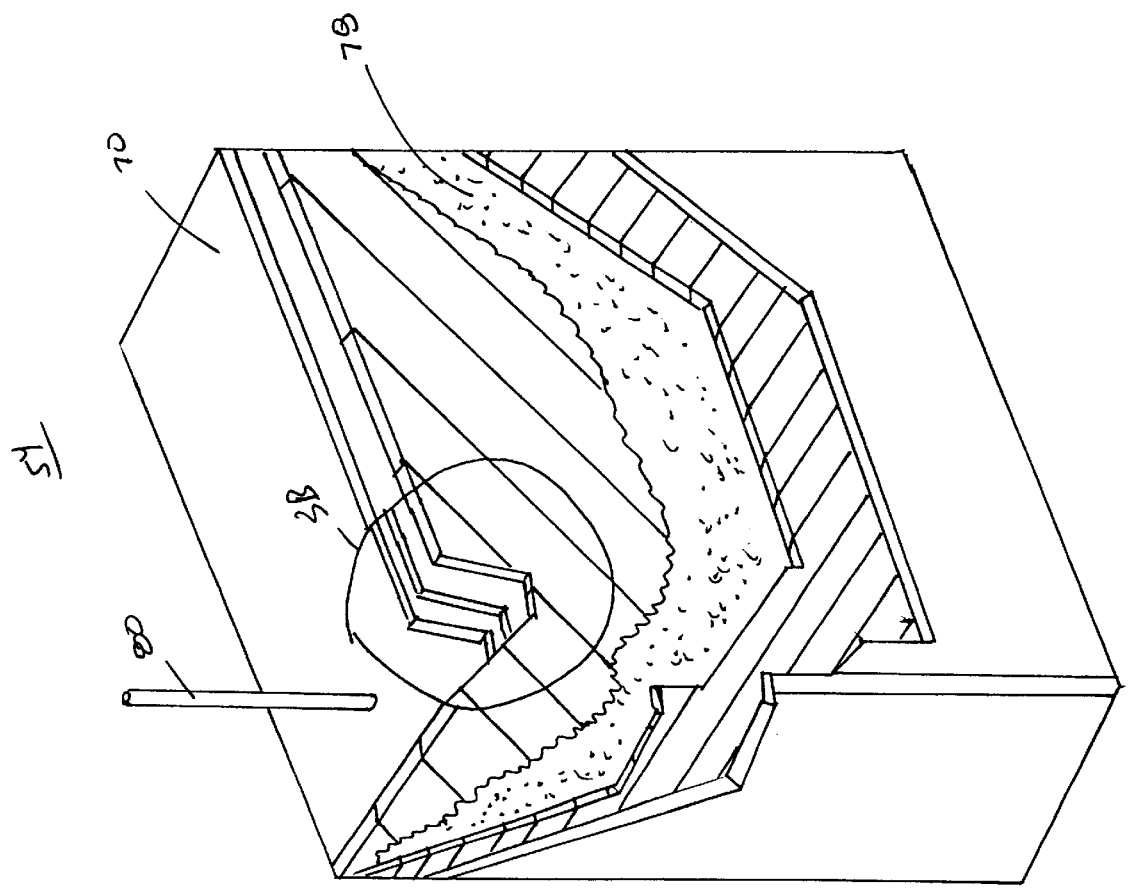
FIG. 3A is a perspective view of an electrochemical cell, with a portion cutaway.
Figure 3B:
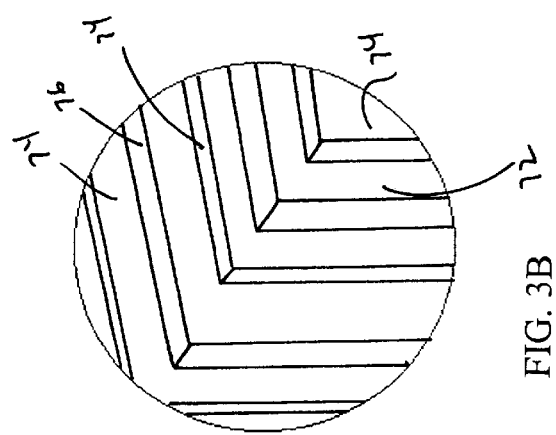
FIG. 3B is an enlarged view of a portion of the cell of FIG. 3A designated by the line 3B.

The battery or cell 54 can assume a wide variety of forms as is known in the art. One example of the battery 54 is shown in FIGS. 3A and 3B. The battery 54 is more properly referred to as an electrochemical cell and includes a case 70, an anode 72, separators 74, a cathode 76, an electrolyte 78 and a feedthrough terminal 80. Regardless of the exact form, the cell 54, which may make use of the present invention, includes an anode 72, a solid cathode 76 and a liquid electrolyte 78 for delivering high current pulses. As described below, the anode 72 is preferably formed to include lithium, either in metallic form or ion form for re-chargeable applications. The case 70 contains the various components and the cathode 76 structure therein is wound in a plurality of turns, with the anode 72 interposed between the turns of the cathode winding. The separator 74 separates the anode 72 from the cathode 76 windings. The case 70 also contains the liquid electrolyte 78, that is preferably a non-aqueous, organic liquid material. In one preferred embodiment, the liquid electrolyte 78 comprises a combination of lithium salt and an organic solvent operatively contacting the anode 72 and the cathode 76. As a result, an electrical connection is provided to the anode 72 and an electrical connection is provided to the cathode 76. Such cells find advantageous use as power sources for implantable cardiac defibrillators. This is an example of the type of battery with which this invention is particularly concerned.

The cell 54 is most preferably a high-capacity, high-rate, spirally-wound battery of the type disclosed, for example, in U.S. Pat. No. 5,439,760 to Howard et al. for "High Reliability Electrochemical Cell and Electrode Assembly Therefor" and U.S. Pat. No. 5,434,017 to Berkowitz et al. for "High Reliability Electrochemical Cell and Electrode Assembly Therefor," the disclosures of which are hereby incorporated by reference herein in their respective entireties.

The cell 54 may less preferably be a battery having spirally-wound, stacked plate or serpentine electrodes of the type disclosed, for example, in U.S. Pat. Nos. 5,312,458 and 5,250,373 to Muffuletto et al. for "Internal Electrode and Assembly Method For Electrochemical Cells;" U.S. Pat. No. 5,549,717 to Takeuchi et al. for "Method of Making Prismatic Cell;" U.S. Pat. No. 4,964,877 to Kiester et al. for "Non-Aqueous Lithium Battery;" U.S. Pat. No. 5,147,737 to Post et al. for "Electrochemical Cell With Improved Efficiency Serpentine Electrode;" and U.S. Pat. No. 5,468,569 to Pyszczek et al. for "Use of Standard Uniform Electrode Components in Cells of Either High or Low Surface Area Design," the disclosures of which are hereby incorporated by reference herein in their respective entireties. Alternatively, the cell 54 can include a single cathode electrode as described, for example, in U.S. Pat. No. 5,716,729 to Sunderland et al. for "Electrochemical Cell," the disclosure of which is hereby incorporated by reference herein in its entirety.

Materials for the cathode 76 are most preferably solid and comprise as active components thereof metal oxides such as vanadium oxide, silver vanadium oxide (SVO) or manganese dioxide. Alternatively, the cathode 76 may also comprise carbon monofluoride and hybrids thereof (e.g., $CF_x$+$MnO_2$) or any other active electrolytic components in combination. Notably a "solid" cathode is in reference to pressed porous solid cathodes, as known in the art. Such cathodes are typically made by mixing one or more active components with poly (tetrafluoroethylene) as a binder and carbon as a conductivity enhancer, and pressing those components to form a porous solid structure. Where the SVO is employed for the cathode 76 to charge and re-charge capacitors, the SVO is most preferably of the type known as "combination silver vanadium oxide" or "CSVO" as disclosed in U.S. Pat. Nos. 5,221,453; 5,439,760 and 5,306,581 and U.S. patent application Ser. Nos. 08/792,413 filed Feb. 3, 1997 to Crespi et al., hereby incorporated by reference herein, each in its respective entirety. It is to be understood, however, that any type of suitable SVO may be employed in cathodes in cells including substitute SVO as disclosed by Takeuchi et al. in U.S. Pat. No. 5,472,810 and disclosed by Leising et al. in U.S. Pat. No. 5,695,892, SVO made by the decomposition method as disclosed by Liang et al. in U.S. Pat. Nos. 4,310,609 and 4,391,729, amorphous SVO as disclosed by Takeuchi et al. in U.S. Pat. Nos. 5,498,494, SVO prepared by the sol-gel method as disclosed by Takeuchi et al. in U.S. Pat. No. 5,558,680, and SVO prepared by the hydrothermal process.

It is to be understood that electrochemical systems other than those set forth explicitly above may also be employed in conjunction with the present invention, including, but not limited to, cathode/anode systems such as: silver oxide/lithium; manganese oxide/lithium; $V_2O_5$/lithium; copper silver vanadium oxide/lithium; copper oxide/lithium; lead oxide/lithium; carbon monofluoride/lithium; chromium oxide/lithium; bismuth-containing oxides/lithium; copper sulfate/lithium; mixtures of various cathode materials listed above such as a mixture of silver vanadium oxide and carbon monofluoride; and lithium ion rechargeable batteries to name but a few.

Regardless of the exact construction of the cell 54, unexpected defects may arise. In particular, a metallic particle may unexpectedly be introduced at the cathode 76. Over time, due to the oxidizing environment presented by the cathode 76, the metallic particle will corrode. The resulting ions diffuse through the separator 74 and on to the anode 72. Contact with the anode 72 causes the metallic particle to plate out and grow back through the separator 74 to the cathode 76, creating a conductive pathway or internal short. This internal short renders the battery 54 defective as the overall open circuit battery voltage is reduced.

Under normal conditions, the corrosion/plating process occurs relatively slowly. Thus, evaluation of the cell 54 for a metallic contaminant-caused defect generally requires storing the battery for at least 11 days, sometimes as long as one month. Prior to storage, the battery 54 is normally subjected to a burn-in, by which the cell 54 is at least partially discharged by a small percentage of its overall capacity. During the subsequent storage period, the voltage of the battery 54 is periodically checked and compared to previous values. A reduction in the measured voltage is highly indicative of a metallic contaminant-caused defect. The evaluation method of the present invention overcomes the lengthy delay associated with previously employed testing methodology.

Figure 4:
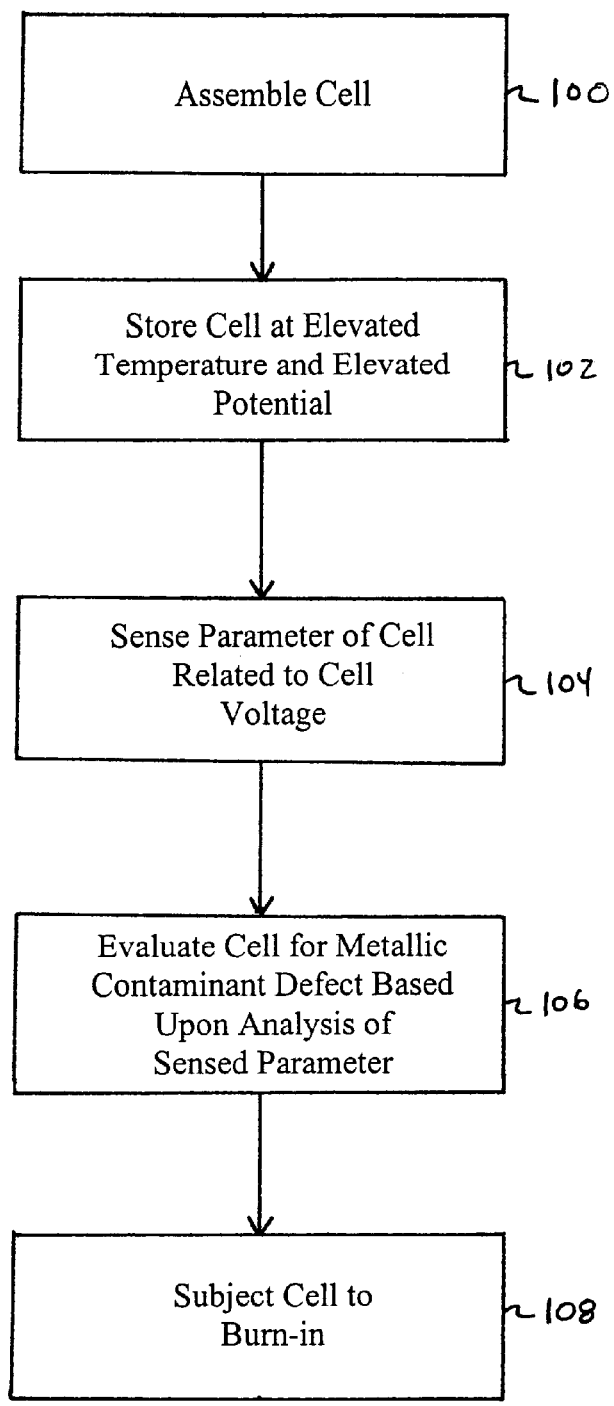
FIG. 4 is a block flow diagram of an electrochemical cell evaluation method in accordance with the present invention.

More particularly, and with reference to FIG. 4, following assembly at step 100, the cell 54 is stored at an elevated temperature at step 102. For example, the cell 54 may be placed within an oven or similar heated storage device. The storage device can assume a wide variety of forms and may rely upon conduction, convection and/or radiation to raise a temperature of the cell 54 above room temperature. In this regard, the cell 54 is preferably stored at a temperature in the range of 25°–80° C.; more preferably 30°–70° C.; most preferably 37°–60° C. For example, in one preferred embodiment, the cell 54 is stored at a temperature of approximately 60° C. Exposing the cell 54 to an elevated temperature greatly accelerates the corrosion of metallic contaminants, if any, introduced onto the cathode 76 of the cell 54. By limiting the maximum temperature to 80° C., opportunity for damage to the cell 54 is greatly minimized.

Notably, in one preferred embodiment, the cell 54 is stored immediately following assembly. That is to say, the cell 54 is not subjected to a burn-in procedure. Thus, the cell 54 is stored at an elevated potential as compared to previous cell evaluation methods. As previously described, following assembly, the cell 54 has a maximum cathode potential. With this in mind, the cell 54 is stored at the elevated temperature with the cell 54 being at approximately the maximum cathode potential. By maintaining the cell 54 at an elevated potential, metallic contaminants, if any, have a higher propensity to corrode.

Due to the acceleration of metallic contaminant corrosion, the cell 54 need only be stored for a relatively short time. In a preferred embodiment, the cell 54 is stored for a time period of less than 11 days; more preferably less than 7 days; and most preferably less than 3 days. In one preferred embodiment, the cell 54 is stored at the elevated temperature for a time period of approximately 1–3 days.

Following storage at an elevated temperature and, preferably, at an elevated potential, the cell 54 is tested. More particularly, at step 104, a parameter of the cell 54 related to cell voltage is measured or otherwise sensed. For example, a voltmeter may be employed to sense cell voltage. Alternatively, an ammeter or similar device may be used. The sensing at step 104 may be performed while the cell 54 is maintained at the elevated temperature, or following removal of the cell 54 from the heated storage device. In one preferred embodiment, only a single measurement need be taken.

Based upon the sensed parameter, a determination is made as to whether the cell 54 is defective at step 106. For example, a deviation in the measured parameter from an expected value for a non-defective cell 54 is indicative of the cell 54 being defective. Alternatively, where a series of cells 54 are manufactured in lot form, standard statistical analysis may be employed to ascertain whether the sensed parameter for any one particular cell deviates too greatly from that of other cells within the same lot. Because the cells 54 are preferably tested prior to burn-in, a tight statistical tolerance range can be employed. In other words, unlike cells subjected to burn-in that must be compared to an absolute value, cells processed in accordance with the present invention are amenable to statistical analysis, thereby enhancing evaluation confidence. Notably, a change or deviation in the sensed parameter related to cell voltage is indicative of the presence of a metallic contaminant within the cell 54.

If the cell 54 is found to be defective for metallic contamination at step 106, the cell 54 is properly disposed of and recycled. Where the cell 54 is not defective for metallic contamination, the cell 54 is then subjected to a normal burn-in procedure at step 108. Burn-in (e.g., discharging the cell 54 by a small percentage of its total capacity) serves to confirm integrity of the cell 54, as well as to stabilize the internal chemistries. Following burn-in, the cell 54 is ready for use.

Figure 5:
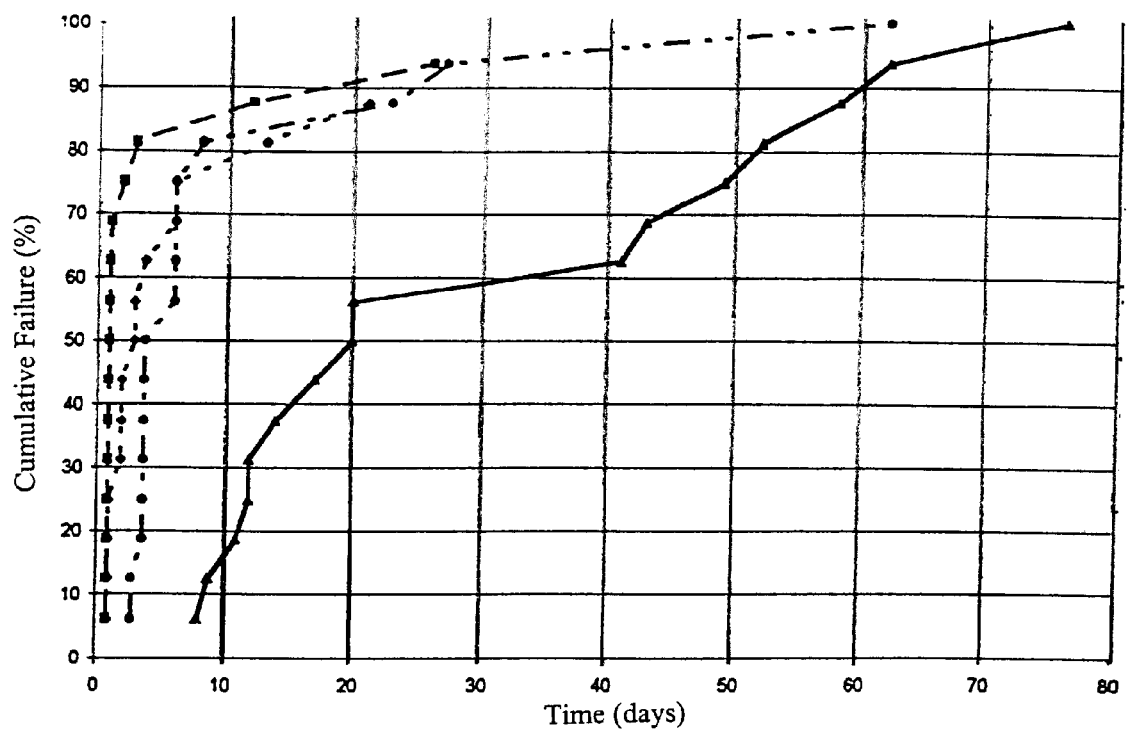
FIG. 5 is a graph showing a comparison of electrochemical cells processed and evaluated for metallic contaminant-caused defects according to the present invention.

Experimental data has proven the efficacy of the method of the present invention. For example, a series of experimental cells were purposefully manufactured to include a metallic contaminant. The cells were then evaluated or tested using methods in accordance with the present invention, the results of which are shown in FIG. 5. As a point of reference, FIG. 5 depicts cumulative failure versus time. Four different defect evaluation methodologies were employed, including batteries not subjected to burn-in and stored at 60° C.; batteries not subjected to burn-in and stored at 37° C.; batteries subjected to burn-in and stored at 60° C.; and batteries subjected to burn-in and stored at 37° C. As a point of reference, because all of the experimental cells were formed to include a contaminant, in theory a cumulative failure of 100% should have been identified for each of the four experimental groups. However, several of the experimental cells had only surface contamination. As a result, the contaminant particle may have fallen off or otherwise lost contact with the cathode, such that the battery did not fail. As shown graphically in FIG. 5, the vast majority of cells stored at 60° C., whether subjected to burn-in or not, failed within the first 11 days. Similarly, the cells not subjected to burn-in (but stored at an elevated temperature) likewise failed within the first 11 days. Pointedly, the cells not subjected to burn-in and stored at 60° C. were most quickly identified, the vast majority of which failed within 1–3 days.

Finally, to confirm that storage at an elevated temperature does not negatively affect cell performance, experiments were performed on cells stored at room temperature (RT), 37° C. and at 60° C. More particularly, each of the so-processed cells was subjected to an acceptance pulse train, commonly used by the industry to evaluate cell performance. To ensure validity of this testing, the cells stored at 37° C. and 60° C. were stored for a time period much greater than 11 days (i.e., 23 days). The resulting data are presented in Table 1 below:

TABLE 1

| No. of Cells | Storage Temp. | Storage Time | Pre-Pulse Open Circuit Voltage (OCV) | Minimum Voltage During Initial Pulse PI | ΔV PI | Minimum Voltage During Final Pulse PF | ΔV PF |
|---|---|---|---|---|---|---|---|
| 18 | 37° C. | 23 days | 3.255 V | 2.438 V | 817 mV | 2.584 V | 427 mV |
| 20 | 60° C. | 23 days | 3.266 V | 2.308 V | 958 mV | 2.588 V | 423 mV |
| 21 | RT | 7 days | 3.249 V | 2.478 V | 771 mV | 2.551 V | 455 mV |

As evidenced by the above table, storing the cells at an elevated temperature does not negatively affect battery performance.

The electrochemical cell evaluation method and system of the present invention provides a marked improvement over previous techniques. In particular, the method of the present invention greatly reduces the storage time required to ascertain whether a particular electrochemical cell contains a metallic contaminant-causing defect. In fact, in one preferred embodiment, cell storage time can be reduced to 1–3 days. Importantly, the method of the present invention consistently identifies defective cells, while at the same time does not negatively impact overall cell performance.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer art will readily appreciate that present invention may be implemented in a wide variety of embodiments. This application is intended to cover any adaptations or variations of the preferred embodiments discussed herein.

What is claimed is:

1. A method of identifying a defective electrochemical cell after assembly, said cell having an anode, a solid cathode and a liquid electrolyte, comprising the steps of:
   storing the cell without burn-in at an elevated temperature for a storage time;
   testing the cell at the end of the storage time period by measuring a parameter of the cell related to cell voltage; and
   determining whether the cell is defective based upon the measured parameter.

2. The method of claim 1, wherein the determination of whether the cell is defective is made based on an evaluation of a deviation of the measured parameter of the cell from a value for a non-defective cell.

3. The method of claim 1 further comprising the step of subjecting the cell to a burn-in procedure wherein the cell is actually discharged to confirm the integrity of the cell.

4. The method of claim 1, wherein the cell is stored at a temperature of less than 80° C.

5. The method of claim 4, wherein the cell is stored at a temperature of greater than 25° C.

6. The method of claim 1, wherein the cell is stored at a storage temperature in the range of approximately 30°–70° C.

7. The method of claim 6, wherein the storage temperature is in the range of approximately 37°–60° C.

8. The method of claim 7, wherein the storage temperature is approximately 60° C.

9. The method of claim 1, wherein the cell is stored at an elevated temperature for a storage time period of less than 11 days.

10. The method of claim 1, wherein the storage time period is less than 7 days.

11. The method of claim 10, wherein the storage time period is in the range of 1–3 days.

12. The method of claim 1, wherein storing the cell at an elevated temperature includes storing the cell at an elevated potential.

13. The method of claim 12, wherein storing the cell at an elevated potential includes not subjecting the cell to burn-in.

14. The method of claim 1, wherein the cell is not at least partially discharged prior to storing at an elevated temperature.

15. The method of claim 1, wherein following assembly, the cell has a maximum cathode potential, and further wherein storing the cell at an elevated temperature occurs approximately at the maximum cathode potential.

16. The method of claim 1, wherein evaluating whether the cell is defective includes statistically analyzing measured parameters for a plurality of assembled and stored cells.

17. The method of claim 1, wherein the anode includes lithium metal.

18. The method of claim 1, wherein the anode includes a lithium ion containing body.

19. A method of evaluating an electrochemical cell for metallic contaminant-caused defect, the electrochemical cell configured for use with an implantable medical device and including an anode, a solid cathode and a liquid electrolyte, the method including:
   following assembly of the cell, storing the cell without burn-in at a temperature of approximately 60° C. for a storage time period in the range of approximately 1–3 days;
   measuring a parameter of the cell related to cell voltage following the storage time period; and
   evaluating whether the cell is defective based upon the measured parameter.

20. A method of manufacturing an electrochemical cell for use with an implantable medical device, the method including:
   assembling the cell such that the cell includes an anode, a solid cathode and a liquid electrolyte;
   storing the cell at an elevated temperature selected to accelerate corrosion of metallic contaminants;
   measuring a parameter of the cell related to cell voltage, wherein the cell is not at least partially discharged prior to measuring the parameter; and
   determining whether the cell is defective by evaluating whether the measured parameter is indicative of a presence of a metallic contaminant in the cell.

21. The method of claim 20, wherein the cell is stored at a temperature of less than 80° C.

22. The method of claim 21, wherein the cell is stored at a temperature of greater than 25° C.

23. The method of claim 20, wherein the cell is stored at a storage temperature in the range of approximately 30°–70° C.

24. The method of claim 23, wherein the storage temperature is in the range of approximately 37°–60° C.

25. The method of claim 24, wherein the storage temperature is approximately 60° C.

26. The method of claim 20, wherein the cell is stored at an elevated temperature for a storage time period of less than 11 days.

27. The method of claim 26, wherein the storage time period is less than 7 days.

28. The method of claim 27, wherein the storage time period is in the range of 1–3 days.

29. The method of claim 20, wherein storing the cell at an elevated temperature includes storing the cell at an elevated potential.

30. The method of claim 29, wherein storing the cell at an elevated potential includes not subjecting the cell to a burn-in.

31. The method of claim 20, wherein the cell is not at least partially discharged prior to storing at an elevated temperature.

32. The method of claim 20, wherein following assembly, the cell has a maximum cathode potential, and further wherein storing the cell at an elevated temperature occurs approximately at the maximum cathode potential.

33. The method of claim 20, wherein a plurality of cells are assembled and stored at the elevated temperature, each of the plurality of cells having the parameter related to cell voltage measured, and wherein evaluating whether the cell is defective includes statistically analyzing the measured parameter for the plurality of cells.

34. The method of claim 20, wherein assembling the cell includes forming the anode to include a lithium metal.

35. The method of claim 20, wherein assembling the cell includes forming the anode to include a lithium ion containing body.

36. The method of claim 20, wherein assembling the cell includes forming the cathode to include silver vanadium oxide.

37. The method of claim 20, wherein assembling the cell includes forming the cathode to include a mixture of silver vanadium oxide and carbon monofluoride.

38. The method of claim 20, wherein assembling the cell includes forming the electrolyte to include an organic material.

39. A method of manufacturing an electrochemical cell for use with an implantable medical device, the method including:

assembling a cell such that the cell includes an anode, a solid cathode and a liquid electrolyte;

following assembly of the cell, storing the cell at a temperature of approximately 60° for a time period in the range of approximately 1–3 days;

measuring a parameter of the cell related to cell voltage; and evaluating whether the cell has a metallic contaminant-caused defect based upon the measured parameter.

40. An electrochemical cell testing system for detecting presence of a metallic contaminant-caused defect in an electrochemical cell configured for use with an implantable medical device, the electrochemical cell including an anode, a solid cathode and a liquid electrolyte, the system comprising:

means for storing the cell at an elevated temperature to accelerate corrosion of metallic contaminants;

means for sensing a parameter of the cell related to cell voltage following storage, said sensing means being configured to produce a value indicative of a presence of a metallic contaminant in the cell; and means for evaluating whether the cell has a metallic contaminant-caused defect based upon the measured parameter.

41. The system of claim 40, wherein the means for storing the cell is configured to maintain the cell at a storage temperature in the range of 25°–80° C.

42. The system of claim 41, wherein the storage temperature is in the range of approximately 37°–60° C.

43. The system of claim 42, wherein the storage temperature is approximately 60° C.

44. The system of claim 40, wherein the means for storing the cell is configured to maintain the cell for a storage time period of less than 11 days.

45. The system of claim 44, wherein the storage time period is less than 7 days.

46. The system of claim 45, wherein the storage time period is in the range of approximately 1–3 days.

47. The system of claim 40, wherein the means for evaluating is configured to perform a statistical analysis of sensed parameters for a plurality of cells.

48. An electrochemical cell testing system for detecting the presence of a metallic contaminant-caused defect in an electrochemical cell configured for use within an implantable medical device, the electrochemical cell including an anode, a solid cathode and a liquid electrolyte, the system comprising:

a storage device configured to store the cell at an elevated temperature for accelerating corrosion of metallic contaminants;

a sensor configured to sense a parameter of the cell related to cell voltage following storage and produce a value indicative of a presence of a metallic contaminant in the cell; and an analyzer configured to determine the presence of a metallic contaminant-caused defect in the cell based upon the value produced by the sensor.

49. The system of claim 48, wherein the means for storing the cell is configured to maintain the cell at a storage temperature in the range of 25°–80° C.

50. The system of claim 49, wherein the storage temperature is in the range of approximately 37°–60° C.

51. The system of claim 50, wherein the storage temperature is approximately 60° C.

52. The system of claim 48, wherein the means for storing the cell is configured to maintain the cell for a storage time period of less than 11 days.

53. The system of claim 52, wherein the storage time period is less than 7 days.

54. The system of claim 53, wherein the storage time period is in the range of 1–3 days.

55. The system of claim 48, wherein the analyzer is configured to perform a statistical analysis of sensed parameters for a plurality of cells.

* * * * *

UNITED STATES PATENT AND TRADEMARK OFFICE
CERTIFICATE OF CORRECTION

PATENT NO. : 6,274,265 B1
DATED : August 14, 2001
INVENTOR(S) : Robert E. Kraska et al.

It is certified that error appears in the above-identified patent and that said Letters Patent is hereby corrected as shown below:

Column 9,
Line 32, delete "actually" and insert -- partially --.

Signed and Sealed this

Eleventh Day of February, 2003

JAMES E. ROGAN
*Director of the United States Patent and Trademark Office*